United States Patent [19]  
Fuhrman

[11] Patent Number: 4,746,691  
[45] Date of Patent: * May 24, 1988

[54] METHOD OF PIGMENTING WATER-ABSORBABLE PLASTICS

[75] Inventor: Ari Fuhrman, Miami Beach, Fla.

[73] Assignee: Color Optics, Ltd., Scarsdale, N.Y.

[*] Notice: The portion of the term of this patent subsequent to Jan. 20, 2004 has been disclaimed.

[21] Appl. No.: 4,676

[22] Filed: Jan. 20, 1987

Related U.S. Application Data

[63] Continuation of Ser. No. 724,039, Apr. 17, 1985, Pat. No. 4,638,025, which is a continuation of Ser. No. 347,082, Feb. 8, 1982, abandoned.

[51] Int. Cl.$^4$ .................... G02C 7/04; C08F 220/28  
[52] U.S. Cl. .................................. 524/40; 524/38; 524/39; 524/457; 524/461; 524/733; 523/105; 523/106; 351/160 H; 351/162  
[58] Field of Search ............. 524/38, 39, 40, 457, 524/461, 733; 523/105, 106, 205, 206; 525/54.21, 54.23; 526/238.21; 351/160 H, 162, 160 R

[56] References Cited

U.S. PATENT DOCUMENTS

| | | | |
|---|---|---|---|
| 3,171,869 | 3/1965 | Weinberg | 351/162 |
| 3,520,949 | 7/1970 | Shepherd et al. | 525/426 |
| 3,557,261 | 1/1971 | Wichterle | 523/106 |
| 3,992,563 | 11/1976 | Tanaka | 351/162 |
| 4,157,892 | 6/1979 | Tanaka et al. | 351/162 |
| 4,234,466 | 11/1980 | Takahashi et al. | 525/481 |
| 4,248,989 | 2/1981 | Novicky | 526/264 |
| 4,252,421 | 2/1981 | Foley, Jr. | 351/162 |

FOREIGN PATENT DOCUMENTS 511827 5/1978 U.S.S.R. ............................. 351/162

Primary Examiner—John Kight  
Assistant Examiner—Nathan M. Nutter  
Attorney, Agent, or Firm—Schechter, Brucker & Pavane

[57] ABSTRACT

A colored opacified plastic material containing an organic binder, at least one pigment, a hydrophilic polymerizable plastic material and a cross linking agent is disclosed together with a method of making the same.

7 Claims, No Drawings

METHOD OF PIGMENTING WATER-ABSORBABLE PLASTICS

This is a continuation of U.S. application Ser. No. 724,039, filed Apr. 17, 1985, entitled "Pigmented Water-Absorbable Plastic materials," now U.S. Pat. no. 4,638,025, which is a continuation of U.S. application Ser. No. 347,082, filed Feb. 8, 1982, now abandoned.

TECHNICAL FIELD

This invention relates to a pigmented plastic material and method for producing the same and particularly to a pigmented plastic material suitable for use in the production of colored soft contact lenses.

BACKGROUND ART

Hydrophilic or soft contact lenses are mainly produced from water-absorbable plastic materials such as 2-hydroxymethacrylate (HEMA) which may be cross-linked with a tetra-functional monomer such as ethylene glycol dimethacrylate as disclosed in U.S. Pat. No. 3,988,274. Soft contact lenses produced from water-absorbable plastic materials such as HEMA are also disclosed in U.S. Pat. No. 3,813,447; 4,252,421 and 3,988,274.

Attempts have been made to color these soft contact lenses for the purpose of enhancing the aesthetic beauty of the eye of the wearer of the colored lens. One prior art technique is to paint or print a colored portion onto a soft contact lens using an implement such as a brush, as disclosed in Contact Lens Forum, Volume 3, No. 8, August, 1978, page 89. Another technique involves the cementing of a colored covering layer onto a clear hydrogel lens, as disclosed in U.S. Pat. No. 3,679,504.

There are, however, several problems with this type of surface coloring technique. First, the color is printed on the lens after it has been manufactured and, therefore, is not uniformly dispersed through the lens material itself. As a result, the color tends to fade and chip away after repeated use. Also, it is necessary to first manufacture the clear lens and fit it on the patient's eye before the coloring takes place. This requires the lens to be sent back to the manufacturing company by the patient's doctor. Moreover, surface coloring inhibits gas permeability, i.e., the transmission of oxygen to the cornea. Finally, the surface coloring process requires additional fabrication steps and equipment.

Coloring of soft contact lenses has also been performed by dispersing water soluble and water insoluble dyes throughout the plastic material which makes up the lens. For example, U.S. Pat. No. 4,252,421 discloses a soft contact lens having a tinted central core which is colored by means of a dye that is dispersed throughout the core and an outer lens element which is usually clear. The colored central core is formed from a tinted button which in turn is polymerized from a co-monomer mixture which includes a dye. The dye may be of two types: water insoluble or polymer bound.

U.S. Pat. No. 4,157,892 discloses a somewhat similar method of producing a colored soft contact lens. Thus, the patent discloses a method of coloring water-absorbable plastic by developing an azoic dye within the hydrophilic contact lens. The water absorbable plastic material containing a coupler is mixed with a diazonium compound in a suitable solvent at optimum pH to produce an azoic dye.

Lenses produced by such dying methods also possess a number of disadvantages. Specifically, the dye in the plastic lens material is not migration proof and, as a result, tends to streak and run out of the lens. Moreover, the dyed lenses are transparent and accordingly cannot be used to change the appearance of the wearer's eye color from one color to another color.

In addition to the use of dyes to color soft contact lenses, pigments have been dispersed in the soft contact lens material in an effort to produce an acceptable lens. These efforts, however, have been ineffective. When attempted with spun-cast soft lenses, little or no pigment has remained properly dispersed in the body of the lens; and when attempted with lenses made by stationery casting and machining (a "lathe cut lens"), such lenses do not have a satisfactorily evenly dispersed color when made in commercial production quantities.

Another area where pigments have been dispersed in an ethylenically unsaturated polymerizable compound is in the manufacture of paint. For example, U.S. Pat. No. 4,234,466 discloses a polymerizable composition containing an ethylenically unsaturated polymerizable compound, a resin and a pigment. The disclosed composition is, however, unsuitable for the production of pigmented hydrophilic contact lenses since the required high degree of pigment dispersion cannot be achieved, while low amounts of pigment failed to result in sufficient coloring.

It is therefore among the objects of the present invention to provide a pigmented water-absorbable plastic material in which low amounts of pigment are evenly dispersed and non-migrating.

It is also among the objects of the present invention to provide a pigmented water-absorbable plastic material useful in the production of colored soft contact lenses.

DISCLOSURE OF INVENTION

It has been found in accordance with the present invention that a hydrophilic polymer comprising a polymerized mixture of a water-absorbable plastic material such as 2-hydroxyethyl methacrylate (HEMA), an organic binder such as cellulose acetate butyrate (CAB), di(2-ethylhexyl)phthalate (DEP), di-isodecylphthalate (DIDP), and acryloid B-66, and at least one pigment is suitable for use in the production of colored soft contact lenses. The hydrophilic polymer is a colored plastic material which contains evenly dispersed, non-migrating non-toxic pigment. When used in soft contact lenses it can be used to change the appearance of the wearers' eye color from one color to another.

According to the invention the colored, non-migrating plastic material is produced by predispersing a low amount of pigment in a suitable binder such as cellulose acetate butyrate, DOP, DIDP or acryloid B-66 to obtain a colored product. The pigment containing binder is thereafter dispersed in a purified water-absorbable polymerizable plastic material such as HEMA. Depending upon the color desired, two or more colored dispersions can be mixed together at this point of the process. The mixture is then pre-polymerized at elevated temperature to form a viscous pigment containing dispersion by adding a polymerization catalyst or polymerization initiator.

The viscous dispersion is then poured into molds and polymerization is continued in an air-circulated oven to form a uniformly opacified colored water-absorbable plastic material in the form of "buttons". These "buttons" can then be used in the production of soft contact lenses.

BEST MODE FOR CARRYING OUT THE INVENTION

As indicated hereinabove, the present invention relates to a colored hydrophilic plastic material comprising a polymerized mixture of a water-absorbable plastic material such as HEMA, an organic binder such as CAB, DEP, DIDP or acryloid B-66, and at least one pigment.

While any suitable water-absorbable plastic material may be employed, HEMA is presently preferred. In general, the water-absorbable plastic material may be present in an amount of from about 96% to about 99% by weight of the composition. A more preferred range is of from about 98% to about 98.5% by weight of the composition. In order to achieve the highest purity, it is preferable to double distill the water-absorbable plastic material prior to use.

As regards the organic binder, suitable materials include CAB, DEP, DIDP and acryloid B-66. CAB (Eastman 381-0.5) is, however, presently preferred. In general, the organic binder is present in an amount of from about 0.4% to about 2% by weight of the composition. A more preferred range is of from about 0.4% to about 1.5% by weight of the composition.

While any suitable pigment may be employed, it is presently preferred that the pigment be heat resistant, non-toxic and insoluble in aqueous solutions. Any colored pigment may be employed. However, since any color can be obtained by merely mixing two or more primary colors together, it is only necessary to use pigments corresponding to the primary colors. As defined herein, "primary colors" mean white, black, red, yellow and blue. It is presently preferred to use the following pigments: Dupont TI-Puri R-900 (a rutile titanium dioxide pigment); Cabot Corporation, Monarch 700 (a furnace black pigment); City Service, Matico Red 297 (a red iron oxide pigment); City Service Matico Yellow 1000 (a yellow iron oxide pigment); and Ferro Company, V 5200 blue (a chromium cobalt aluminum pigment). The particle size of the pigments used in the present invention generally varies from about 0.02 microns to about 1.0 microns According to the present invention, it is preferable that the plastic material be substantially opacified. In order to produce on this material, it is necessary to include at least one opacifying pigment. Since only the black and white pigments can produce an opaque material, it is presently preferred to employ small amounts of a black and/or a white pigment in the composition. Generally, one or both of the opaque colors are employed together with one or more of the other primary colors to produce the color desired. For example, if green is the color desired, a blue pigment, a yellow pigment and a white pigment are mixed together. The amounts of each pigment will, of course, depend on the shade of green which is desired. If a gray-blue color is desired, a blue pigment, a black pigment and a white pigment are mixed together so as to produce the desired color. Again, the relative amounts of the pigments will vary depending upon the shade of the color desired.

In general, the pigment or mixtures thereof are present in the composition in an amount of from about 0.2% to about 1.5% by weight of the composition. If a white pigment is employed in the composition, it is generally present in an amount of from about 0.4% to about 1.5% by weight of the composition. If a blue pigment is employed, it is generally present in an amount of from about 0.32% to about 1.25% by weight of the composition. If a yellow pigment is used in the composition, it is generally present in an amount of from about 0.33% to about 1.25% by weight of the composition. If a black pigment is employed in the composition, it is generally present in an amount of from about 0.3% to about 1.5% by weight of the composition. Finally, if a red pigment is employed in the composition, it is present in an amount of from about 0.33% to about 1.25% by weight of the composition.

It is necessary that the composition of the present invention also include a crosslinking agent in order to prevent precipitation of the pigment during production. Any suitable crosslinking agent may be employed. However, it is presently preferred to use an olefin glycol dimethacrylate such as ethylene glycol dimethacrylate. The crosslinking agent is preferably added to the purified water-absorbable plastic material at elevated temperature prior to the introduction of the pigment-binder composition although the crosslinking agent may also be added thereafter. Thus, preferably, the liquid HEMA is heated to about 40° C. to 45° C. while the crosslinking agent is added.

According to the present invention, the colored, non-migrating plastic material is produced by a process comprising pre-dispersing a pigment in a suitable organic binder; thereafter, adding the pigment containing organic binder to a water-absorbable plastic material and polymerizing the mixture to form the final product.

The preliminary step of pre-dispersing the desired pigment in a suitable binder is extremely important since attempts to introduce the pigment directly into the hydrophilic component have failed to give the desired result, i.e., the pigment cannot be kept in finely divided dispersed form but will precipitate almost immediately so that after a polymerization thereof a uniform colored product cannot be obtained.

Thus, the binder, preferably CAB (Eastman 381-0.5 cellulose acetate butyrate) is first melted at a suitable temperature in a suitable container. The pigment or a mixture of pigments is thereafter added whereby the pigment is absorbed in the CAB. Alternatively, and as presently preferred, separate pigment-binder compositions containing only one of the five primary color pigments may be prepared and mixed at a later stage, as will be more fully explained hereinafter.

In general, the amount of pigment added to the organic binder is of from about 10 to about 80% preferably from about 20% to about 50% by weight of the total pigment-binder composition. A white pigment-binder composition may contain of from about 40 to about 60% by weight of pigment based on the weight of the pigment-binder composition, while a black pigment-binder composition may contain of from about 30 to about 60% by weight of the pigment-binder composition. A red pigment-binder composition may contain of from about 33 to about 50% by weight of the pigment-binder composition. A blue pigment-binder composition may contain of from about 32 to about 50% by weight of the pigment-binder composition, while a yellow pigment-binder composition may contain of from about 33 to about 50% by weight of the pigment-binder composition. After the pigment has been introduced into the organic binder, the composition is thoroughly mixed and subsequently cooled and crushed to form a pigmented binder composition.

The pigmented binder composition is then introduced into a test tube containing the crosslinked water-absorbable polymerizable compound, preferably crosslinked 2-hydroxyethylmethacrylate (HEMA) which is preferably purified by double distillation prior to use. The pigmented binder composition will slowly dissolve in the HEMA. Preferably the mixture is left standing for about 8 to about 12 hours. The pigmented binder composition is thus softened and subsequently evenly dispersed in the HEMA. Mixing may be accomplished by subjecting the mixture to an ultrasonic vibrator in a water bath for about 30 to 60 minutes until the pigmented binder residue has disappeared from the bottom of the test tube and a uniform dispersion thereof in the HEMA is obtained.

After the pigmented binder residue has been evenly dispersed throughout the HEMA, the various colored pigmented HEMA dispersions can be mixed together to produce the desired color. For example, if green is the desired color, three parts of a blue pigmented HEMA dispersion, fourteen parts of a yellow pigmented HEMA dispersion and one part of a white pigmented HEMA dispersion are thoroughly mixed together to form the desired color. If a gray-blue color is desired, one part of a blue pigmented HEMA dispersion, two parts of a black pigmented HEMA dispersion and eight parts of a white pigmented HEMA dispersion are mixed together to form the desired color. It is, of course, within the skill of the art to mix the primary colors to produce various secondary colors and shades thereof.

As stated hereinabove, the group of crosslinking agents that can be used according to the present invention includes olefin glycol dimethacrylates such as ethylene glycol dimethacrylate. In general, the crosslinking agent is added dropwise in an amount of from about 0.35 to about 0.5% by weight of HEMA, preferably in an amount of from 0.4 to about 0.46%. After addition of the crosslinking agent the crosslinking agent containing HEMA is thoroughly mixed for at least 30 minutes. If desired, the subsequent water uptake of the water-absorbable plastic material may be increased by the addition of small amounts of methacrylic acid.

It is imperative that the dispersed pigment is at all times kept in a uniformly dispersed state. To avoid precipitation of the pigment, the liquid mixture is transformed into a gel by the addition of a polymerization catalyst such as an organic peroxide. It is presently preferred to employ a liquid organic peroxide. The presently preferred catalyst is 2,5 dimethyl-2,5 bis (2-ethyl hexoyl peroxy) hexane (USP 245, manufactured by U.S. Peroxygen Witco Chemical Corporation according to U.S. Pat. No. 3,264,274 which is hereby incorporated by reference). As the catalyst is added, the mixture is stirred. Heat should not be applied. In general, the catalyst is added in an amount of from about 0.05 to about 0.125 ml.

The pigmented HEMA and catalyst-containing flask is then introduced into a water bath having a temperature of from about 75° to about 95° C. While partial polymerization proceeds, the flask is frequently rotated so as to avoid precipitation of the pigment. After 3 to 10 minutes, depending on the pigment, the amount of catalyst used and the temperature applied, the dispersion will become viscous or gel-like. At this point, the gel-like dispersion is cooled in an ice water bath to inhibit further polymerization. It is then poured into suitable molds to form so-called "buttons" from which contact lenses may be fabricated. When the dispersion is poured into molds, the polymerization of the final product is continued by placing the molds into an air-circulated oven at temperatures of from about 50° to about 70° C. for about 45 to about 60 minutes. Alternatively, the viscous, syrup-like dispersion may be formed into "buttons". The "buttons" can then be used to manufacture colored soft contact lenses according to any suitable process.

The following examples are illustrative only of the practical and presently preferred embodiment of the invention and are not to be understood in a limiting sense.

EXAMPLE 1

100 g of white pigment (DuPont TI-PURI R-900) are introduced into 100 g of molten cellulose acetate butyrate (Eastman 381-0.5) and intensively mixed. Upon cooling of the mixture to about room temperature a white, opaque product is obtained which is crushed into white particles. 0.10 to 0.15 g of the white particulate product are added to 10 ml of twice distilled crosslinked 2-hydroxyethyl methacrylate (HEMA) in a test tube and left standing overnight. Prior to the addition of the white pigment 0.4% by weight of HEMA of ethylene glycol dimethacrylate were added. The pigmented HEMA containing test tube is then immersed into a waterbath at room temperature and subjected to ultrasonic vibrations for 45 minutes, whereby all pigment residue will disappear from the bottom of the test tube. The white composition is cooled down to room temperature and 2 drops of USP 245 (manufactured by U.S. Peroxygen, Witco Chemical Corp. according to U.S. Pat. No. 3,264,274) are added and stirred with a magnetic stirrer. The flask is then introduced into a water bath at 80° C. for about five minutes thus obtaining a syrup-like composition and then cooled in an ice bath to stop the starting polymerization. The content of the flask is poured into cylindrical molds and polymerization is continued in an air-circulated oven at 60° C. for 45 minutes. Final curing and annealling is achieved by placing the buttons into an oven at a temperature between 90° C. and 100° C. for 12 hours. The final water-absorbable product contains the white pigment in non-migrating uniformly dispersed form.

EXAMPLE 2

100 g of blue pigment (Ferro Company, V 5200 Blue) and 100 g of molten CAB are mixed and formed into a particulate blue product. In a separate test tube, 100 g of yellow pigment (City Service Mapico Yellow 1000) are dispersed in 100 g of molten CAB and also formed into a particulate yellow product.

The blue and yellow pigmented particulate products are separately dispersed in 10 ml of HEMA at conditions similar to those described in Example 1. Three parts of the blue pigment containing HEMA dispersion are admixed with fourteen parts of the yellow pigment containing HEMA dispersion and one part of the white pigment containing HEMA dispersion of Example 1 so as to obtain an opacified, green colored HEMA dispersion. To the green HEMA dispersion USP 245 is added and the dispersion is further processed and formed into an opacified green product in accordance with the method described in Example 1.

EXAMPLE 3

100 g of blue pigment (Fero Company V5200 blue) and 100 g of molten CAB are mixed and formed into a particulate blue product. In a separate test tube 20 g of black pigment (Cavit Corporation, Monarch 700) are dispersed in 80 g of molten CAB and also formed into a crystalline black product.

The blue and black pigmented particulate products are separately dispersed in 10 ml of HEMA at conditions similar to those described in Example 1. One part of the blue pigment containing HEMA dispersion is mixed with two parts of the black pigment containing dispersion and eight parts of the white pigment containing HEMA dispersion of Example 1 so as to obtain an opacified, gray-blue colored HEMA dispersion. To the gray-blue crosslinked HEMA dispersion 3 drops of USP 245 are added and the dispersion is further processed and formed into an opacified, gray-blue product in accordance with the method described in Example 1.

I claim:

1. A method for producing a colored, water-absorbable soft contact lens blank, which comprises:
    (a) melting a cellulose acetate butyrate (CAB) binder;
    (b) pre-dispersing at least one pigment into the molten CAB;
    (c) cooling and crushing the pigmented CAB binder into a particulate product;
    (d) dispersing the particulate product in 2-hydroxyethylmethacrylate (HEMA) containing crosslinking agent, in proportions such that the resulting dispersion contains from about 96 to 99% by weight HEMA and from about 0.4 to 0.74% CAB by weight;
    (e) gelling the HEMA dispersion of the pigmented CAB; and
    (f) polymerizing the gelled dispersion within a mold to produce the desired colored, water-absorbable soft contact lens blank.

2. The method according to claim 1, wherein said water-absorbable soft contact-lens blank is cured following polymerization.

3. The method according to claim 1, wherein the crosslinking agent for the HEMA is ethylene glycol dimethacrylate.

4. The method according to claim 1, wherein polymerization of the gelled dispersion is catalyzed by an organic peroxide.

5. The method according to claim 1, wherein the resulting dispersion formed in step (d) contains HEMA in a concentration range of from about 98 to 98.5% by weight.

6. A method for producing a colored, water-absorbable soft contact lens, which comprises:
    (a) melting a cellulose acetate butyrate (CAB) binder;
    (b) pre-dispersing at least one pigment into the molten CAB;
    (c) cooling and crushing the pigmented CAB binder into a particulate product;
    (d) dispersing the particulate product in 2-hydroxyethylmethacrylate (HEMA) containing crosslinking agent, in proportions such that the resulting dispersion contains from about 96 to 99% by weight HEMA and from about 0.4 to 0.74% CAB by weight;
    (e) contacting the HEMA dispersion of the pigmented CAB with a polymerization catalyst to form a viscous colored material; and
    (f) spin casting the viscous colored material into a pigmented water-absorbable contact lens.

7. The method according to claim 6, wherein the resulting dispersion formed in step (d) contains HEMA in a concentration range of from about 98 to 98.5% by weight.

* * * * *